July 11, 1961 R. J. BONDLEY 2,992,007
PHONOGRAPH STYLUS
Filed Dec. 27, 1957

Inventor:
Ralph J. Bondley,
by Richard R. Brainard
His Attorney.

United States Patent Office 2,992,007
Patented July 11, 1961

2,992,007
PHONOGRAPH STYLUS
Ralph J. Bondley, Scotia, N.Y., assignor to General Electric Company, a corporation of New York
Filed Dec. 27, 1957, Ser. No. 705,630
3 Claims. (Cl. 274—38)

The present invention relates to improved phonograph pick-up styli of the type having a diamond or other gem stone tip.

The superiority of diamonds as a tip for phonograph pick-up devices has long been known. Many arrangements for mechanically securing a diamond to a support have been employed but these constructions have required a long shank on the diamond and the mechanical fastening required relatively massive parts and resulted in an expensive device causing substantial record wear and poor high frequency response. Attempts to overcome these disadvantages have been made by bonding a smaller, less expensive diamond to a suitable shank by means of a bonding or brazing process. One such process involves the use of titanium hydride powder as a wetting agent to facilitate the brazing of the diamond to a metal shank. Metal shanks such as iron, nickel-iron alloys and beryllium-copper have been used. I have found that a phonograph stylus having a shank of titanium or zirconium exhibits an unusual number of very desirable characteristics and results in a superior stylus. For example, titanium has a much lower thermal coefficient of expansion than iron or steel and thus provides a better match with the gem stones and creates less built-in stress when the stone is soldered to the shank and cooled over a substantial temperature range. It is non-magnetic and it is of light weight, being only a little more than half as heavy as iron. Titanium has a density of 4.5 grams per cubic centimeter as compared with 7.9 grams per cubic centimeter for iron and 8.9 grams per cubic centimeter for copper. It yields readily by plastic flow so that it tends to self-relieve stress set up due to the difference in expansion characteristics between the shank and the diamond. It is an active metal facilitating the bond with the diamond and resulting in a strong joint. Accordingly, it is an important object of my invention to provide improved phonograph styli of the type having a bonded gem stone which is light in weight, has good frequency response, low record wear, and may be readily manufactured by mass-production methods without undue shrinkage due to defective or substandard items in the finished product.

Further objects and advantages of my invention will become apparent as the following description proceeds, reference being had to accompanying drawing and its scope will be pointed out in the appended claims. In the drawing:

Figure 1:
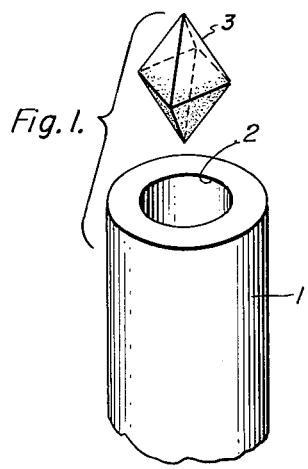
FIGURE 1 is an elevational view in perspective of a shank or holder and diamond prior to assembly.
Figure 2:
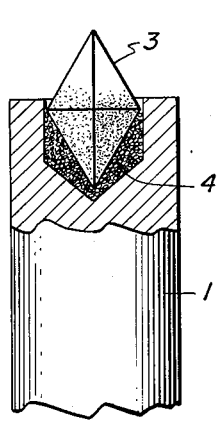
FIGURE 2 is an elevational view partially in section showing the parts of FIGURE 2 assembled and ready for soldering.
Figure 4:
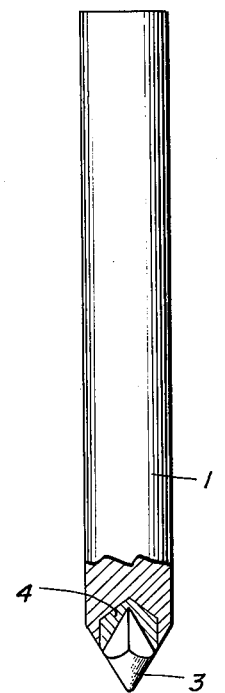
FIGURE 4 is an elevational view partially in section of a finished stylus after the mounting of the diamond.

In carrying out my invention, in accordance with a preferred embodiment thereof, a piece of rod-stock of titanium is drilled out from one end to provide a generally cylindrical recess 2 for the reception of a gem stone such as a diamond 3, as shown in FIGURE 1. The diamond as illustrated is of somewhat idealized shape (octahedron) but many of the small diamonds do approach this shape. As illustrated in FIGURE 2, the diameter and depth of the recess are a little greater than the corresponding dimensions of the diamond to be mounted to provide a pocket for a body of solder 4. Although the many solders are suitable for attaching the diamond to the shank 1 a granulated nickel solder provides a bond having desirable characteristics. The granulated nickel is placed in the recess and the diamond positioned as shown. Other solders which may be used successfully include pure silver, silver-copper, silver lead, and iron, for example.

Figure 3:
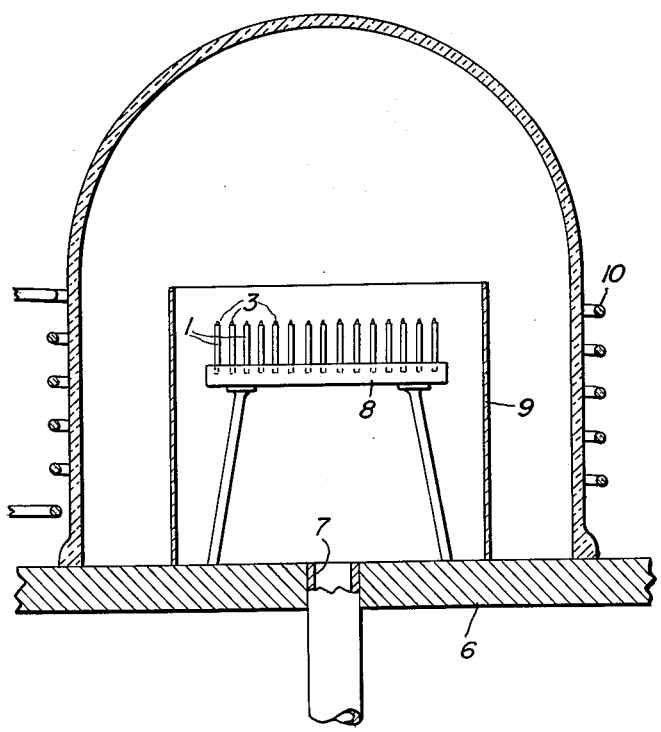
FIGURE 3 is an elevational view in section of suitable apparatus for bonding the diamond and shanks together.

In FIGURE 3 I have shown an elevational view in section of suitable apparatus for simultaneously bonding together the diamonds and shanks of a number of assemblies of the type shown in FIGURES 1 and 2. As shown in FIGURE 3, a suitable enclosure or bell-jar 5 is supported from a table 6 provided with an opening 7 communicating with a vacuum system so that the interior of the enclosure 5 may be evacuated. A suitable support 8 having a large number of small openings drilled in the upper surface thereof to receive the shanks 1 of the assembled styli is provided. A thin cylindrical oven 9 of a refractory metal such as tantalum surrounds the support 8 to heat the assembled styli by radiation when the oven is heated by electromagnetic induction. The heating of the oven is accomplished by means of a high frequency coil 10 surrounding the bell-jar and energized from suitable high frequency source (not shown).

In carrying out the brazing or bonding operation the bell-jar is exhausted and the parts gradually heated to drive off the gases. As a pressure approaching 1 micron of mercury, for example, is attained the temperature is brought up to the melting temperature of the nickel-titanium combination, which is about 960° C. to form a liquid melt around the diamond and the assembly is then allowed to cool. The titanium is an active metal and facilitates the wetting of the diamond and the successful chemical bond thereto. While it is not necessary when using a titanium or zirconium shank, the wetting of the diamond may be still further promoted by applying a thin coating of a slurry of titanium to the area of the diamond to be bonded. The slurry is made by mixing titanium hydride to the suitable volatile binder such as nitrocellulose lacquer or amyl acetate.

After the brazing operation the exposed end of the diamond is ground to a conical point having a rounded tip of about .001 inch radius. The shank then may be suitably reduced in diameter by turning on a lathe and a shank of suitable length for mounting the diamond on the pick-up arm cut from the assembly. In one embodiment of the invention the starting rod stock is about .040 inch in diameter and the recess for the diamond is about .025 inch. The diamond or the finished shank may be reduced to something in the order of .025 inch, it being appreciated that the maximum transverse dimension of the diamond may be reduced somewhat during the grinding operation. The overall length including the exposed portion of the diamond may be in the order of .070 inch.

Diamond tipped styli of the present invention offer many advantages both in manufacture and in use. The use of titanium or zirconium as the material of the shank facilitates the production of a good chemical bond making it possible to utilize a physically small mounting structure. In addition, as previously pointed out, the low thermal coefficient expansion relative to other metals such as iron, for example, result in less built-in stress after the bond is made and minimizes the tendency of the diamond to loosen from the shank during the subsequent grinding operation. Its light weight contributes to reduced record wear and improves the high frequency response and it is non-magnetic which is an advantage in pick-ups utilizing a magnetic field.

Thus, the present invention affords a marked improvement in this highly competitive field where there is at present an increasing need for a relatively low cost high quality stylus of very small dimensions and mass.

It will be understood that when other solders are used the temperature at which the brazing takes place will vary in accordance with the melting point of the particular alloys present in the brazing operation. For pure silver the brazing will take place at approximately 960°, with iron at a little over a 1000° C. and with silver-copper at about 780° C. and with a 30% silver 70% lead solder at about 500° C. to 600° C. This latter solder is relatively soft and yields well to minimize built-in stresses. If the temperature limits are not exceeded in the grinding operation this provides a very desirable solder.

Figure 5:
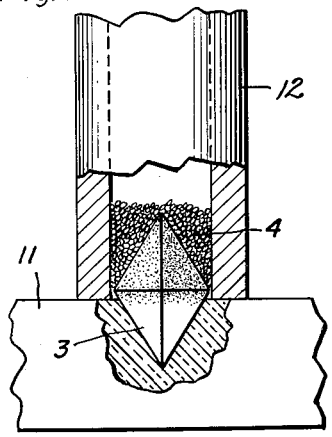
FIGURE 5 is an elevational view in section illustrating a modified form of stylus embodying my invention.

In FIGURE 5 there is illustrated a further embodiment of my invention which may be very useful particularly in those cases where the finished styli required are not too small. In accordance with the embodiment there illustrated a plurality of diamonds 3, to be mounted, are cemented, temporarily, to a suitable recessed plate 11 and the shanks 12, each consisting of titanium tubing slipped into assembled position as shown. The solder 4 is then introduced from the upper and open end of the tubing. The remainder of the operation is essentially the same as that described in connection with the preceding figures except that the brazing operation is carried out with the tip end of the styli downward.

Zirconium is, in many ways, very similar to titanium and may be used in accordance with the present invention. As compared with titanium it has a lower temperature coefficient of expansion but since the brazing temperature will be slightly higher when zirconium is used, these two characteristics tend to off-set one another. Also, zirconium is not as active as a wetting agent as titanium.

While the present invention has been described in connection with gem-tipped styli, such as diamonds, it will be appreciated that it is applicable to all styli of the type having a wear-resistant tip bonded to a shank.

While I have described particular embodiments of my invention it will be apparent to those skilled in the art that changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. A phonograph stylus comprising a shank of metal selected from the group consisting of titanium and zirconium, said shank having a recess in one end thereof and a gem stone bonded to the walls of said recess and having a shaped-end protruding from the end of said shank.

2. A phonograph stylus comprising a shank of metal tubing selected from the group consisting of titanium and zirconium and a gem stone having a portion entering within said tubing and bonded to the inner wall thereof and a portion extending beyond the end of said tubing.

3. A phonograph stylus comprising a shank of metal selected from the group consisting of titanium and zirconium, a tip of wear-resistant material bonded to one end of said shank and having a shaped-end extending from the end of said shank.

References Cited in the file of this patent
UNITED STATES PATENTS

| | | |
|---|---|---|
| 2,363,272 | Taeyaerts et al. | Nov. 21, 1944 |
| 2,438,111 | Campbell | Mar. 23, 1948 |
| 2,603,492 | Baker | July 15, 1952 |

FOREIGN PATENTS

| | | |
|---|---|---|
| 281,186 | Great Britain | Dec. 1, 1927 |

OTHER REFERENCES

Titanium Metal and Its Future, TN799, T5B8 C.3, Patent Office Scientific Library (pages 9 and 10). (Copy in Div. 3.)

Metals Handbook, published by Amer. Soc. for Metals, 1948, p. 1143. (Copy in Div. 3.)